(12) United States Patent
Sandlerman et al.

(10) Patent No.: US 9,882,828 B1
(45) Date of Patent: Jan. 30, 2018

(54) SYSTEM, METHOD, AND COMPUTER PROGRAM FOR PLANNING DISTRIBUTION OF NETWORK RESOURCES IN A NETWORK FUNCTION VIRTUALIZATION (NFV) BASED COMMUNICATION NETWORK

(71) Applicant: Amdocs Software Systems Limited, Raanana (IL)

(72) Inventors: Nimrod Sandlerman, Ramat Gan (IL); Eyal Felstaine, Hertzeliya (IL); Ofer Hermoni, Yavne (IL); Itzik Kitroser, Beer Sheva (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 147 days.

(21) Appl. No.: 14/625,596

(22) Filed: Feb. 18, 2015

Related U.S. Application Data

(60) Provisional application No. 62/078,365, filed on Nov. 11, 2014.

(51) Int. Cl.
G06F 15/173 (2006.01)
H04L 12/911 (2013.01)

(52) U.S. Cl.
CPC .................................. *H04L 47/74* (2013.01)

(58) Field of Classification Search
CPC ............ H04N 21/4437; G06F 9/45533; G06F 3/0662; G06F 2009/45595
See application file for complete search history.

(56) References Cited

U.S. PATENT DOCUMENTS

| | | | |
|---|---|---|---|
| 2013/0182714 A1* | 7/2013 | Vachharajani | H04L 45/44 370/400 |
| 2015/0124622 A1* | 5/2015 | Kovvali | H04W 28/0215 370/236 |

* cited by examiner

Primary Examiner — Esther B Henderson
(74) Attorney, Agent, or Firm — Zilka-Kotab, PC

(57) ABSTRACT

A system, method, and computer program product are provided for planning distribution of one or more network resources in a Network Function Virtualization based (NFV-based) communication network. In use, at least one Virtual Network Function (VNF) instance of a VNF is migrated between processing units in a NFV-based communication network, according to a change of load. Further, a lack of at least one network resource associated with at least one network node is reported for planning distribution of one or more network resources in the NFV-based communication network, the missing network resource at least partially limiting migration of one or more VNF instances.

16 Claims, 10 Drawing Sheets

US 9,882,828 B1

SYSTEM, METHOD, AND COMPUTER PROGRAM FOR PLANNING DISTRIBUTION OF NETWORK RESOURCES IN A NETWORK FUNCTION VIRTUALIZATION (NFV) BASED COMMUNICATION NETWORK

CLAIM OF PRIORITY AND RELATED APPLICATIONS

This application claims the benefit of U.S. Provisional Application No. 62/078,365, filed Nov. 11, 2014, the entire contents of which are incorporated herein by reference.

FIELD OF THE INVENTION

The present invention relates to telecommunications and/or data communications and, more particularly to network function virtualization (NFV) of telecommunications networks.

BACKGROUND

Network Function Virtualization is a term or a name of a proposed architecture of telecom services as published by the European Telecommunications Standards Institute (ETSI) in a series of documents available from the ETSI website. NFV uses generic hardware platform and software adapted for the generic hardware platform. Thus, NFV creates a network much more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on almost any generic hardware processing facility. Therefore, VNFs may be installed, removed, and moved between hardware facilities, much more easily, less costly and thus, more frequently.

The flexibility of the NFV-based network enhances the means available for optimizing the network's capacity and performance. However, current techniques for planning the distribution of network resources based on such optimization are limited.

There is thus a need for addressing these and/or other issues associated with the prior art.

SUMMARY

A system, method, and computer program product are provided for planning distribution of one or more network resources in a Network Function Virtualization based (NFV-based) communication network. In use, at least one Virtual Network Function (VNF) instance of a VNF is migrated between processing units in a NFV-based communication network, according to a change of load. Further, a lack of at least one network resource associated with at least one network node is reported for planning distribution of one or more network resources in the NFV-based communication network, the missing network resource at least partially limiting migration of one or more VNF instances.

DETAILED DESCRIPTION

Figure 1:
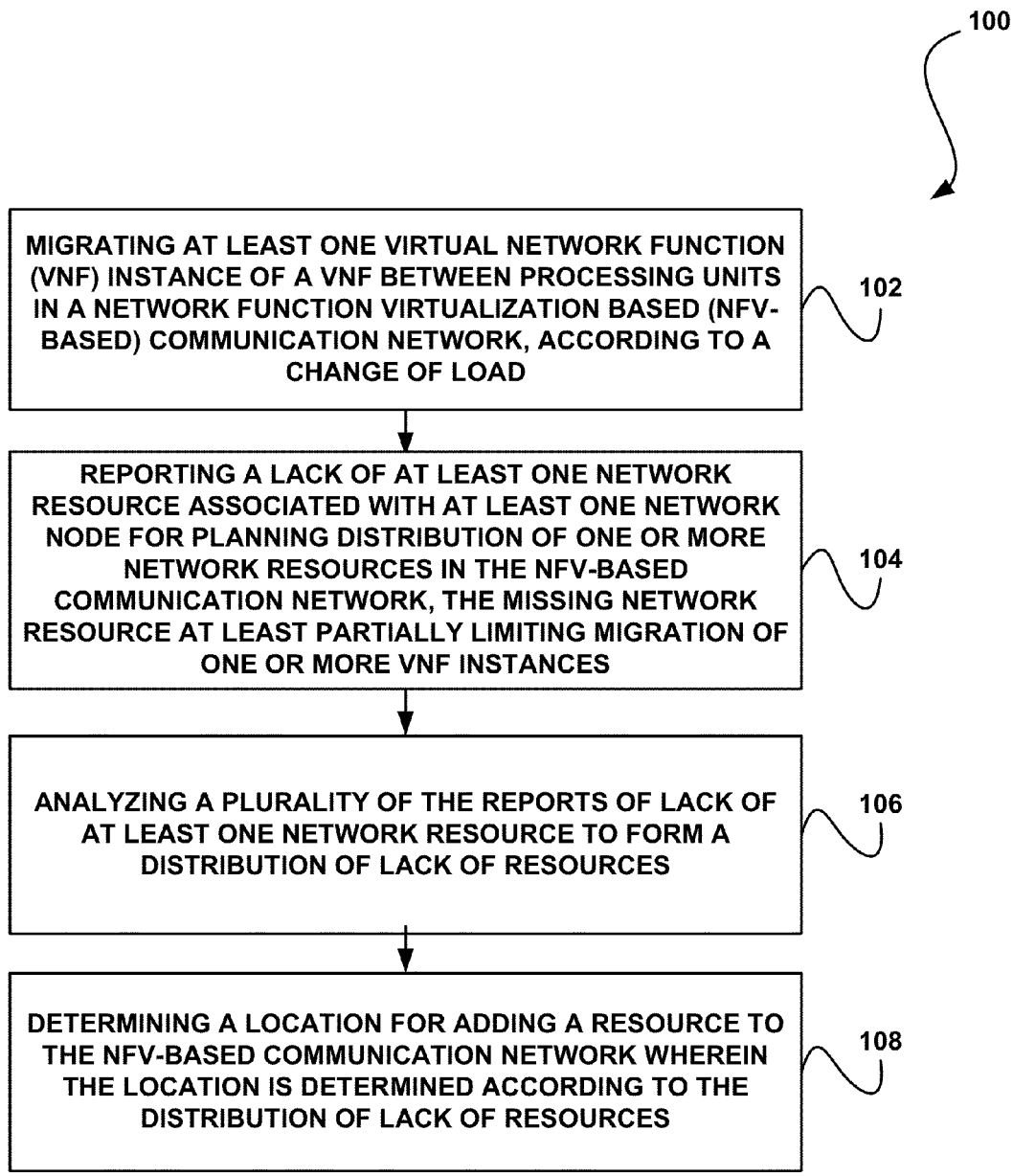
FIG. 1 illustrates a method for planning distribution of one or more network resources in a NFV-based communication network, in accordance with one embodiment.

FIG. 1 illustrates a method 100 for planning distribution of one or more network resources in a NFV-based communication network, in accordance with one embodiment.

As shown, at least one Virtual Network Function (VNF) instance of a VNF is migrated between processing units in a NFV-based communication network, according to a change of load. See operation 102.

With further reference to FIG. 1, a lack of at least one network resource associated with at least one network node is reported for planning distribution of one or more network resources in the NFV-based communication network, the missing network resource at least partially limiting migration of one or more VNF instances. See operation 104.

The network resource may include any resource associated with the NFV-based communication network and/or elements associated therewith. For example, the network resource may include processing power, memory, storage, transmission, electricity, cooling, etc., and/or any combination thereof.

Further, the reporting of the lack of the resources may come in various forms. For example, in one embodiment, the report may be a user interface displayed report. In another embodiment, the reporting may include utilizing a graphical interface. In another embodiment, the reporting may be in the form of an alert. Of course, in various embodiments, any number of reporting techniques may be employed.

Additionally, the missing network resource may limit migration of one or more VNF instances in various ways. For example, the missing network resource may at least partially limit migration of the one or more VNF instances responsive to a particular change of load. As another example, the missing network resource may at least partially limit migration of a service comprising a plurality of VNF instances. Further, as another example, the missing network resource may at least partially limit migration of a service comprising a plurality of VNF instances deployed over a plurality of processing units. Of course, the limiting aspect of the missing network resource may be indicated as part of the reporting.

In one embodiment, the method 100 may further include analyzing one or more of the reports of the lack of at least one network resource to form a distribution of a lack of resources. See operation 106. In this case, a location for adding a resource to the NFV-based communication network may be determined, where the location is determined based on the distribution of the lack of resources. See operation 108.

In the context of the present description, the terms "network" and "communication network" refer to the hardware and software connecting one or more communication elements including wireline networks, wireless networks, and/or combinations thereof.

The terms "network function virtualization" (NFV) and virtual network function (NFV) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that a NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g., a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breech or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The principles and operation of a system, method, and computer program product for planning distribution of one or more network resources in a NFV-based communication network according to various embodiments may be further understood with reference to the following drawings and accompanying description.

Figure 2:
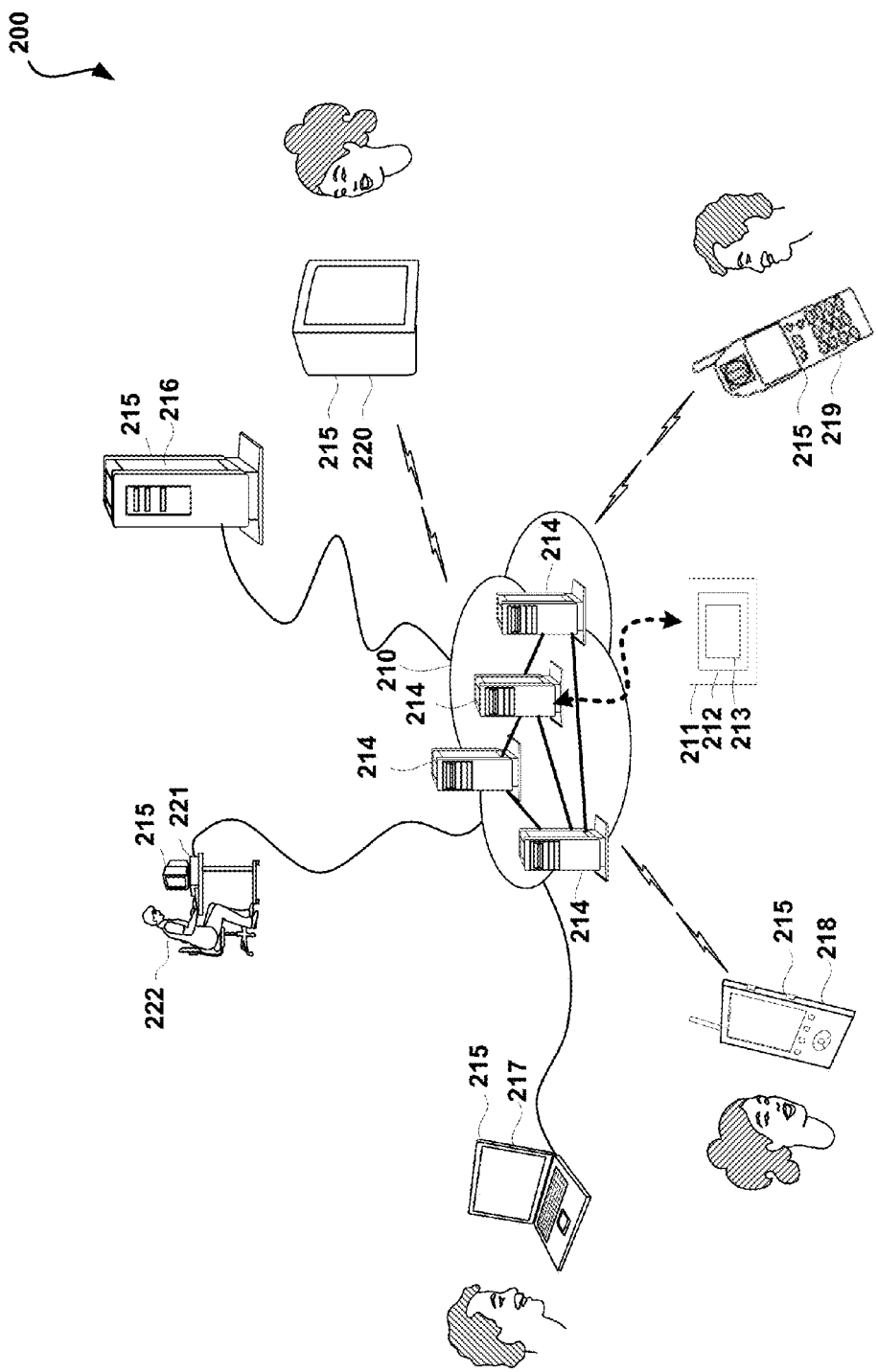
FIG. 2 illustrates a simplified diagram of a system associated with an NFV-based communication network, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 2111, an NFV-orchestration (NFV-O) module 212, and a network resource deployment optimization module 213, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212 and the network resource deployment optimization module 213.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

The network resource deployment optimization module 213 may be a part or a component of the NFV-O module 212. However, the network resource deployment optimization module 213, the NFV-O module 212 and the NFV management system 211 may be separate software programs provided by different vendors. In one embodiment, the NFV-based network 210 may even have a plurality of any of the NFV management systems 211, the NFV-O modules 212, and/or the network resource deployment optimization module 213.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g., cable, aerial, mobile, or satellite television, etc.) 2, etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211, the NFV-O 212, and the network resource deployment optimization module 213.

Figure 3:
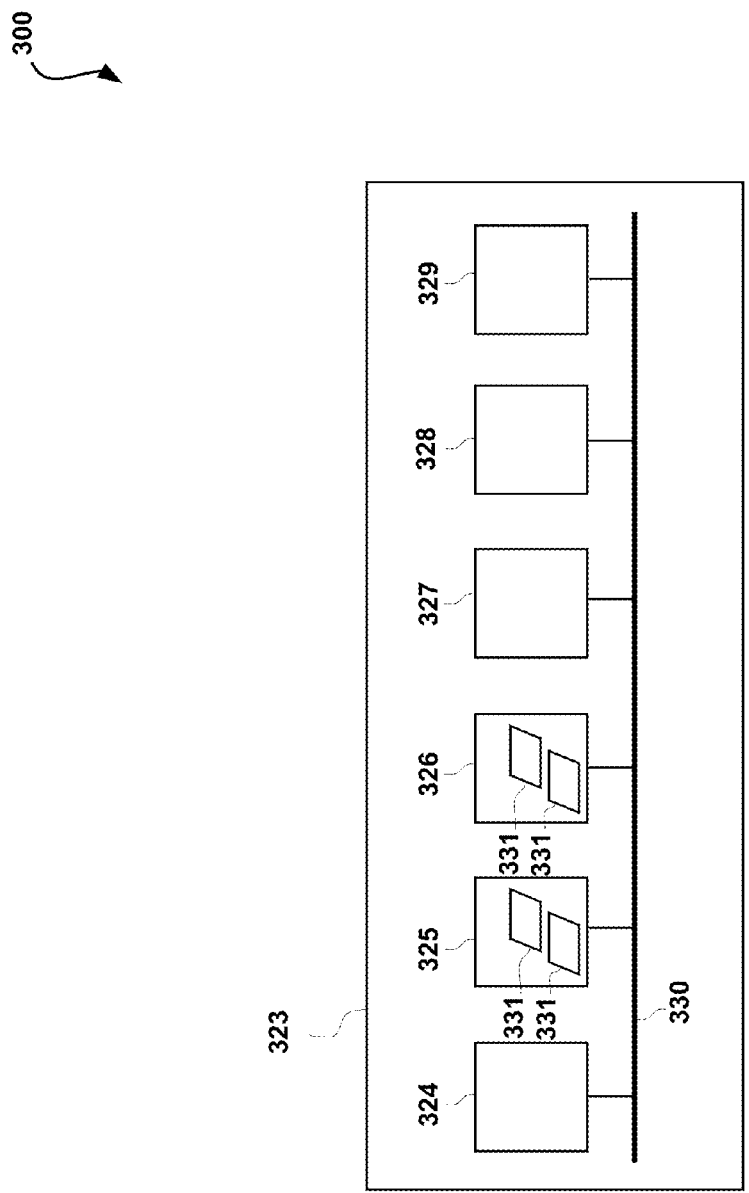
FIG. 3 illustrates a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g., RAM, dynamic, or volatile memory, etc.), non-volatile memory (e.g., such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g., random access memory (RAM), a non-volatile memory such as a Flash memory, etc.), one or more storage units 326 (e.g., including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g., as set forth in the context of FIG. 1, etc.). The memory units 325 and/or the storage units 326 and/or any other storage are possible examples of tangible computer-readable media.

It is appreciated that computer program 331 may include any of the NFV management system 211, the NFV-O 212, and/or the network resource deployment optimization module 213 of FIG. 2.

Figure 4:
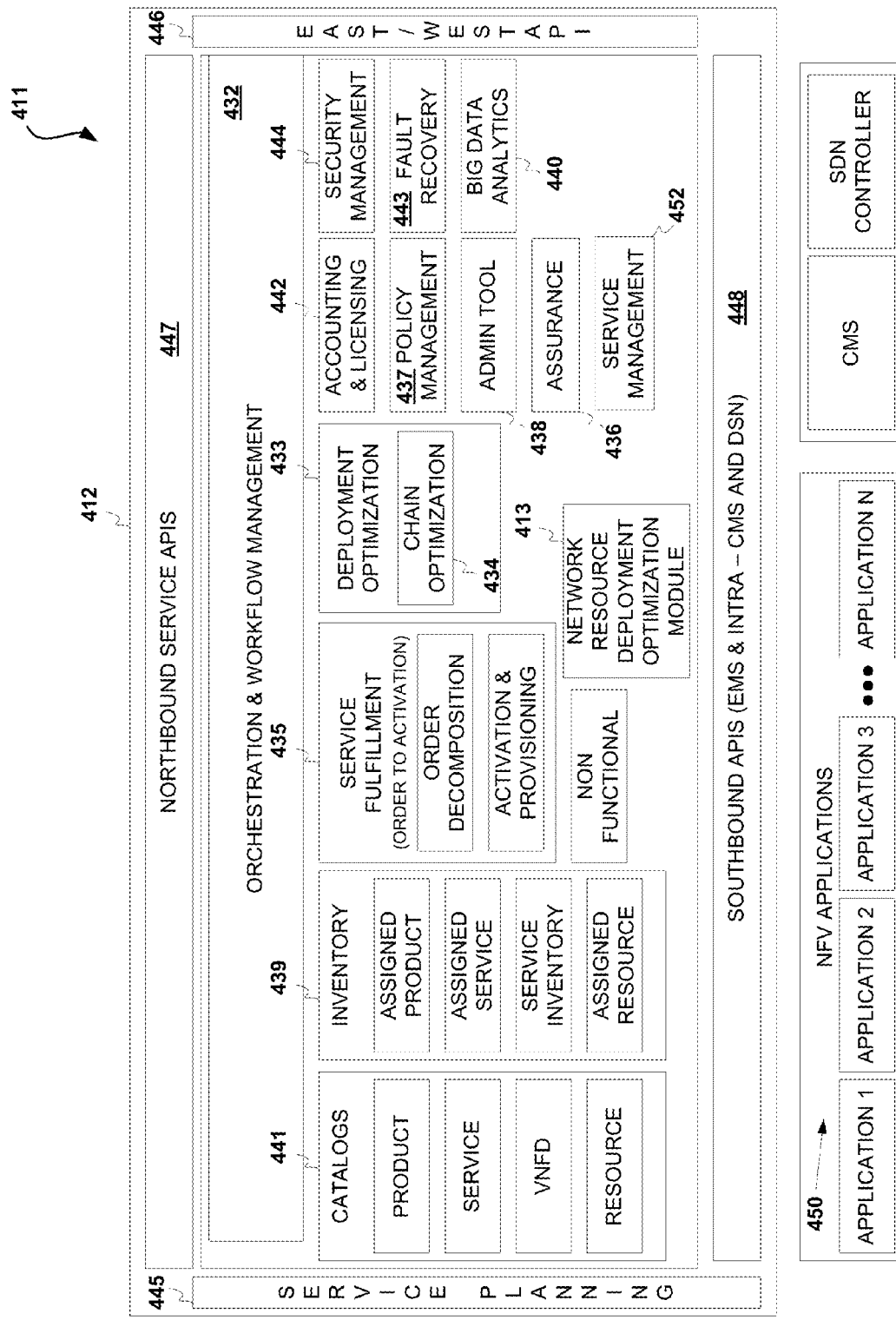
FIG. 4 illustrates a simplified diagram of an NFV management system, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412, and a network resource deployment optimization module 413. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g., VNF instances 551 of FIG. 5, etc.) between hardware units (e.g., hardware units 551 of FIG. 5, etc.).

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

The NFV management system 411 may also include a service fulfillment module 435 that manages service and resource (e.g., VNF) instance lifecycle activities as part of the process and orchestration activities. This may include on boarding, initiation (e.g., instantiation), installation and configuration, scaling, termination, software update (e.g., of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g., such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfillment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g., including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g., administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g., Virtual Network Capacity Planning, Data Center Capacity Planning, Value based planning, Cost analysis for network deployment alternatives, etc.), deployment and management (e.g., Guided Operator Recommendations, What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g., a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g., prices, rating, etc.) based on service composition (e.g., in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

The NFV management system 411 may also include a security management module 444 that provides the authentication authorization and accounting services of application security across the network. The security management module 444 may include, for example, an authentication module and function. In one embodiment, the authentication module and function (e.g., including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g., standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The network resource deployment optimization module 413 may also be part of the NFV-O module 412.

In embodiment, the network resource deployment optimization module 413 may include a computer software program for managing functions and features associated with the deployment and operation of VNFs and VNF-instances in NFV-based networks. In particular, the network resource deployment optimization module 413 may be operable to migrate at least one VNF instance between processing units in the NFV-based communication network, according to a change of load. Moreover, in one embodiment, the VNF deployment optimization module 433 (and chain optimization module 434) may be operable to report a lack of at least one network resource associated with at least one network node for planning distribution of one or more network resources in the NFV-based communication network, where the missing network resource at least partially limits migration of one or more VNF instances. Thus, the VNF deployment optimization module 433 (and chain optimization module 434) may report the shortage, and thereafter the network resource deployment optimization module 413 may receive the reports, analyze them, and generate a new hardware deployment plan, or make modifications to the hardware deployment plan.

It should be noted that the network resource deployment optimization module 413 may function to carry out any number of steps, processes, and/or techniques associated with network planning and optimization in an NFV-based network, including VNF deployment optimization and hardware deployment optimization.

In a conventional (legacy) communication networks the data processing units are provided in the perimeter of the network and the network itself provides transmission and switching only. An NFV-based network includes general purpose computing systems in the core of the network. This hierarchical-mesh processing topology increases the flexibility of allocating processing resources to customers and users.

In one embodiment, the network planning and optimization may include two parallel processes: 1) a VNF deployment optimization process; and 2) a hardware deployment optimization process.

The basic goal of the network resource deployment optimization module 413 is to reduce the cost of the network equipment (e.g., CAPEX), and to reduce the cost of operating the network (e.g., OPEX) while maintaining the quality of the services rendered (e.g., QoS, SLA, etc.). This basic goal may be translated into two operative goals: 1) that during periods of peak load the network hardware is used to the maximum possible level (lowest CAPEX); and 2) that during periods when the load is less than the peak load as much as possible of the network hardware is turned off to reduce the cost of operating the network (lowest OPEX). In both situations, the goal is that the amount of unused hardware is minimized. To further optimize cost reduction, the hardware deployment may be arranged so that hardware can be turned off firstly where energy is more expensive.

The VNF deployment optimization process assumes a given topology of network resources, namely, a given deployment of processing units, memory units, storage units, etc., and the transmission lines connecting them (i.e. hardware deployment). The VNF deployment optimization process may plan the deployment of VNFs and VNF instances over the given hardware deployment according to the customers' needs, QoS, QoE, SLA, considering requirements such as loads, preventive maintenance, fault recovery, security, cost of operation, etc.

The VNF deployment optimization process may be executed continuously to follow the ever changing customers' needs, loads, faults, and costing, as well as the ever changing network resources availability. As the VNF deployment optimization process calculates the most effective and efficient deployment of VNFs (maximizing the capacity and minimizing the cost), it may also generate requirements for modified hardware deployment.

The hardware deployment optimization process may receive the hardware requirements generated by the VNF deployment optimization process over time, and generate a new hardware deployment plan. After the new hardware deployment plan is implemented, it may be used by the VNF deployment optimization process for optimizing the VNF deployment in run-time. Hardware deployment optimization is typically implemented by relocating and/or adding network resources such as processing power, memory, storage, communication (transmission) links, etc.

Traditional network optimization assumes a static network and a variable demand generating peak temporal loads. The optimization reconfigures the network to support the peak loads. Traditional network reconfiguration is performed off-line.

An NFV-based network enables dynamic reconfiguration of the network, performed in real-time, without interrupting the network services. VNF optimization processes may use methods such as resource conversion and VNF migration. VNF migration is a process by which one or more VNF instances are moved from one resource, or processing unit, to another. Resource optimization is a process by which an available resource is converted to a required but unavailable resource. For example, if local storage is in short but communication bandwidth to a remote storage is available, the available bandwidth is practically converted into available storage (instead, for example, of moving the respective local VNF instance requiring additional storage to the remote unit). Thus, unsatisfied peak loads result from limitations on resource conversion and/or VNF migration (rather than the static topology of the hardware network).

Limitations on resource conversion and VNF migration may be, for example, available transmission capacity to a processing unit lacking processor power, memory, storage capacity, etc. Similarly, limitations on resource conversion and VNF migration may also be, for example, lack of transmission capacity to a processing unit having the required processor power, memory, storage capacity, etc. Resolving such limitations may enable the NFV-based network to migrate VNFs to reduce latency during peak load periods, or to shut-down processing units in periods of low demand.

The ability of the VNF deployment process to identify limitations on resource conversion and VNF migration is enhanced regarding requirements for executing preventive maintenance, planning fault recovery, providing security services, as well as other services comprising a plurality of VNFs deployed over a plurality of hardware units.

Current network optimization techniques assume that the network topology is static. The NFV-based network topology is dynamic, in the sense that VNF instances may be moved (migrated) around the network to redistribute the loads and compensate for load changes (e.g., implementing resource conversion). However, this dynamic VNF redeployment (or deployment optimization) process may be limited by the network configuration/topology on the one hand and VNF chain requirements on the other hand. Relocating or adding particular resources in strategic places may provide more optimization options and improve the network's utilization.

More information associated with migrating VNF instances may be found in U.S. Provisional Patent Application No. 61/918,597, filed Dec. 19, 2013, titled "System, Method, And Computer Program For Preserving Service Continuity In Network Function Virtualization (NFV)-Based Networks", and U.S. patent application Ser. No. 14/572,716, filed Dec. 16, 2014, titled "SYSTEM, METHOD, AND COMPUTER PROGRAM FOR PRESERVING SERVICE CONTINUITY IN A NETWORK FUNCTION VIRTUALIZATION (NFV) BASED COM- MUNICATION NETWORK", which are incorporated herein by reference in their entirety.

More information associated with VNF chains may be found in U.S. Provisional Patent Application No. 62/026,512, filed Jul. 18, 2014, titled "System, Method, And Computer Program For Optimizing A Chain Of Virtual Network Functions In A Network Based On Network Function Virtualization (NFV)", and U.S. patent application Ser. No. 14/572,728, filed Dec. 16, 2014, titled "SYSTEM, METHOD, AND COMPUTER PROGRAM FOR OPTIMIZING A CHAIN OF VIRTUAL NETWORK FUNCTIONS IN A NETWORK BASED ON NETWORK FUNCTION VIRTUALIZATION (NFV)", which are incorporated herein by reference in their entirety.

More information associated with fault recovery may be found in U.S. patent application Ser. No. 14/572,726, filed Dec. 16, 2014, titled "SYSTEM, METHOD, AND COMPUTER PROGRAM FOR MANAGING FAULT RECOVERY IN NETWORK FUNCTION VIRTUALIZATION (NFV) BASED NETWORKS", which is incorporated herein by reference in its entirety.

More information associated with preventative maintenance may be found in U.S. patent application Ser. No. 14/572,732, filed Dec. 16, 2014, titled "SYSTEM, METHOD, AND COMPUTER PROGRAM FOR PERFORMING PREVENTATIVE MAINTENANCE IN A NETWORK FUNCTION VIRTUALIZATION (NFV) BASED COMMUNICATION NETWORK", which is incorporated herein by reference in its entirety.

More information associated with managing security may be found in U.S. patent application Ser. No. 14/572,723, filed Dec. 16, 2014, titled "SYSTEM, METHOD, AND COMPUTER PROGRAM FOR MANAGING SECURITY IN A NETWORK FUNCTION VIRTUALIZATION (NFV) BASED COMMUNICATION NETWORK", which is incorporated herein by reference in its entirety.

A conventional process of network analysis tracks the development of loads in the static network. In an NFV-based network the load development is compensated by the dynamic VNF deployment optimization process. A failure to meet requirements such as QoS, QoE, SLA, bandwidth, latency, jitter, etc., may be therefore detected for application, or in parts of the network, as determined by the VNF deployment optimization process. Namely, the VNF deployment optimization process may decide to relocate VNFs so that a load peak is transferred to another part of the network or affect less important applications.

The optimal hardware reconfiguration may therefore not be located at any of the location of the source of the load peak and the location of the failure. For example, the load problem might have been solved by migrating a VNF unrelated to both the source and the failing VNFs. However, that VNF may not migrate to the available resource due to particular inter VNF restrictions (i.e. chain optimization considerations). The source of data for the hardware optimization process may therefore be 'failures' of the VNF optimization process. In this respect, the term "VNF optimization process" includes service optimization and VNF chain optimization as well as similar mechanisms for optimizing the deployment of a group of two or more VNFs or VNF instances.

The VNF optimization process may provide data for the hardware optimization process based on a variety of scenarios, such as low efficiency deployment, high efficiency deployment, and optimization bottlenecks, etc.

As an example of low efficiency deployment, a load failure may have occurred (e.g., QoS, QoE, SLA, etc. requirement was not met, etc.) while at least one relevant resource of the network was still available. For example, there may have been insufficient processing power for a particular VNF while unused processing power is available elsewhere in the network.

In this case, the VNF optimization process could have failed to migrate VNFs (and process resource conversion) so as to redistribute the load efficiently. For example, the VNF optimization process may have performed some migration, resource conversion, and load redistribution, but not sufficiently. The process of seeking an optimal deployment may have tried at least one deployment option that failed because it did not meet a particular requirement. For example, this may include an inter-VNF latency limit of a VNF in a VNF chain unrelated to both the source and the failing VNFs.

In this example, the VNF optimization process may report such 'intermediate failures' to the hardware optimization process. In one embodiment, each such report may include the peak load situation including loads involved and their source VNFs. This may include requirements not met and identification of the failing VNFs, as well as resources that are available but unusable (e.g., due to insufficient availability or the resource itself, insufficient availability of transmission to the resource, etc.). Further, the reports may include details of the VNF optimization process failure including VNFs (and VNF chains) and their respective requirements and resources which failed the optimization process. In some cases, there may be several VNF optimization process failures (and reports) for each peak load situation.

The hardware optimization process may collect a large enough number of optimization failure reports to evaluate the possible changes to the hardware deployment. For example, this may include VNFs or VNF chains that cause or are involved in more optimization failures, resources that cause or are involved in more optimization failures, and/or resources that are commonly or frequently 'available but unusable'.

The hardware optimization process may propose a modified hardware deployment and run the collected set of load failures, activating the VNF optimization process for each load failure, to verify that the modified hardware deployment indeed improves the situation. The hardware optimization process may plan and check a plurality of hardware deployment plans before the best plan is selected.

As an example of high efficiency deployment, a load failure may have occurred (e.g., QoS, QoE, SLA, etc. requirement was not met, etc.), or almost occurred, because all network resources were used. The hardware optimization process must determine what resources should be added, how much of such resources, and where they should be added, such that most of the peak load conditions are satisfied.

Again, the hardware optimization process may suggest solutions (e.g., adding particular resources in particular nodes of the network) and use the VNF optimization process to determine and compare optimization plans for the set of collected load failures. The hardware optimization process may then select the solution that is most effective, or most efficient, or least costly.

It is appreciated that 'adding particular resources in particular nodes of the network' may refer to adding a computational resource such as processing power, memory, storage, etc., and also to adding transmission resources, such as adding communication bandwidth between two or more computational resources.

As an example of optimization bottleneck, a particular service too complex to be moved may exist. This service may not necessarily be consuming too much of any resource, and may not cause any peak load. However, the service may be deployed over many resources and because of inter-VNF requirements no VNF may be migrated to release a resource. Enabling an alternative deployment of at least some of the VNFs of the services may open many new possibilities for the VNF optimization process to resolve peak load situations.

With further reference to FIG. 4, the NFV management system 411 may also include east/west APIs 446 that include various domains/activities interfaces, including an information source to a big data repository, and interaction capability with one or more physical network systems (OSS).

Northbound APIs 447 provides application programming interfaces (APIs) to various external software packages, such as business support system (BSS) for service order fulfillment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities—receiving from the infrastructure status and monitoring information for upstream system and activities [e.g., assurance]), an SDN Controller (or other connectivity system) to configure inter and intra data center connectivity, an EMS to configure the VNF, and a VNF for a direct configuration.

Figure 5:
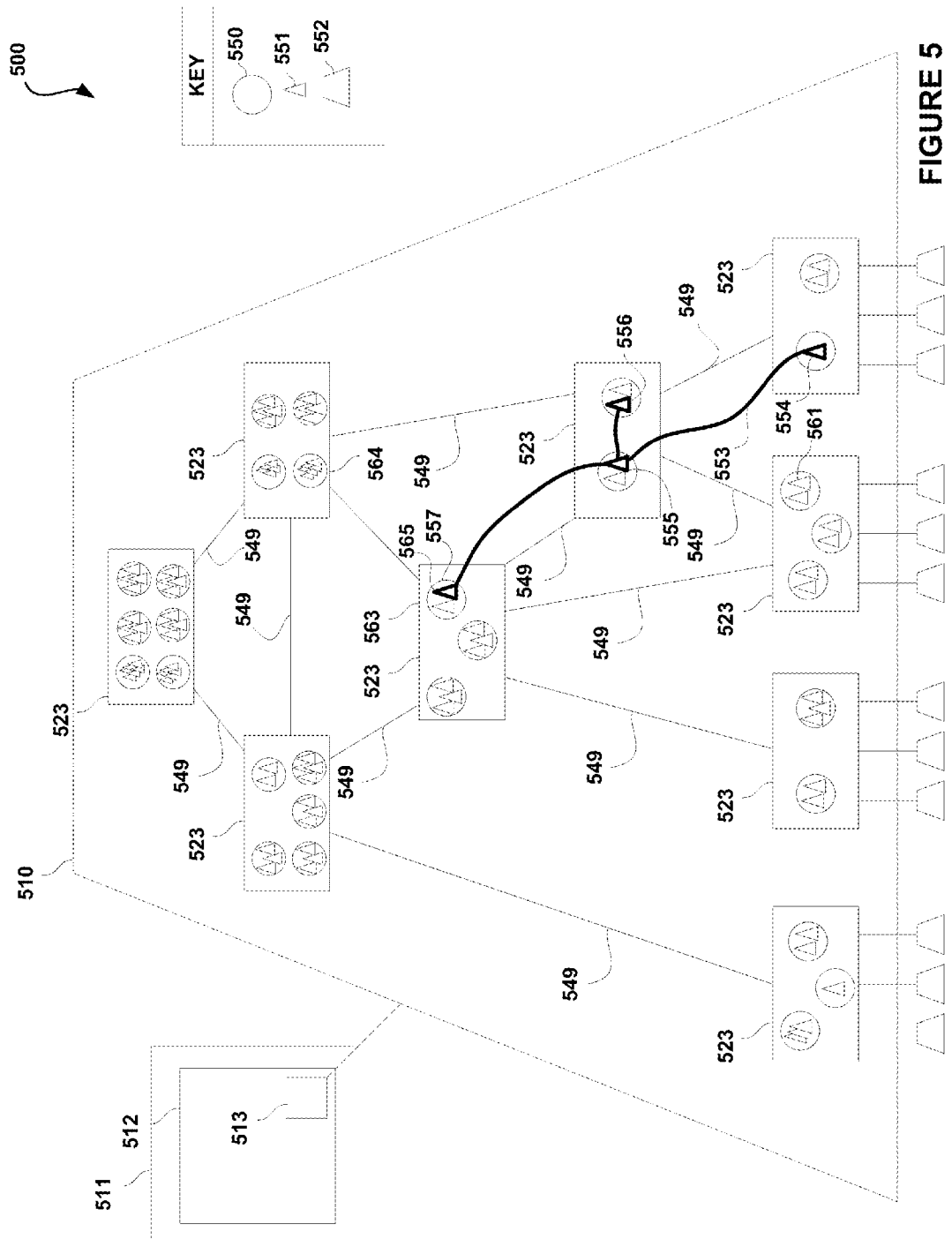
FIG. 5 illustrates a simplified diagram of a deployed NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include a NFV management system 511, an NFV-orchestration (NFV-O) 512, and a resource distribution module 513 (which may all represent elements described in the context of the previous figures, etc.).

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g., initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g., the server computer 216, etc.), whether in the premises of the network operator or in the customer's premises. In other words, the NFV-based network 510 may be managing the VNFs 550 and the VNF instances 551 providing the services, as well as the terminal devices 552 (e.g., the server computer 216, etc.) being co-located within the same computing device (e.g., the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g., RAM, dynamic, or volatile memory, etc.), non-volatile memory (e.g., such as flash memory, etc.) capacity, storage capacity, power requirements, cooling requirements, etc. A particular VNF instance 551 providing a particular function (e.g., to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for rollback and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551. In this respect, VNF deployment optimization refers to the software and operational aspects while hardware optimization refers to the networking and processing aspects. The term VNF deployment optimization includes aspects of VNF migration including or involving chain optimization, preventive maintenance, fault recovery, security management, defragmentation processes, NFV-O deployment recovery processes, load consolidation, etc.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g., module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g., the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g., the distribution of VNFs among the hardware devices) is much less costly than any modification of the hardware topology.

However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

Figure 6:
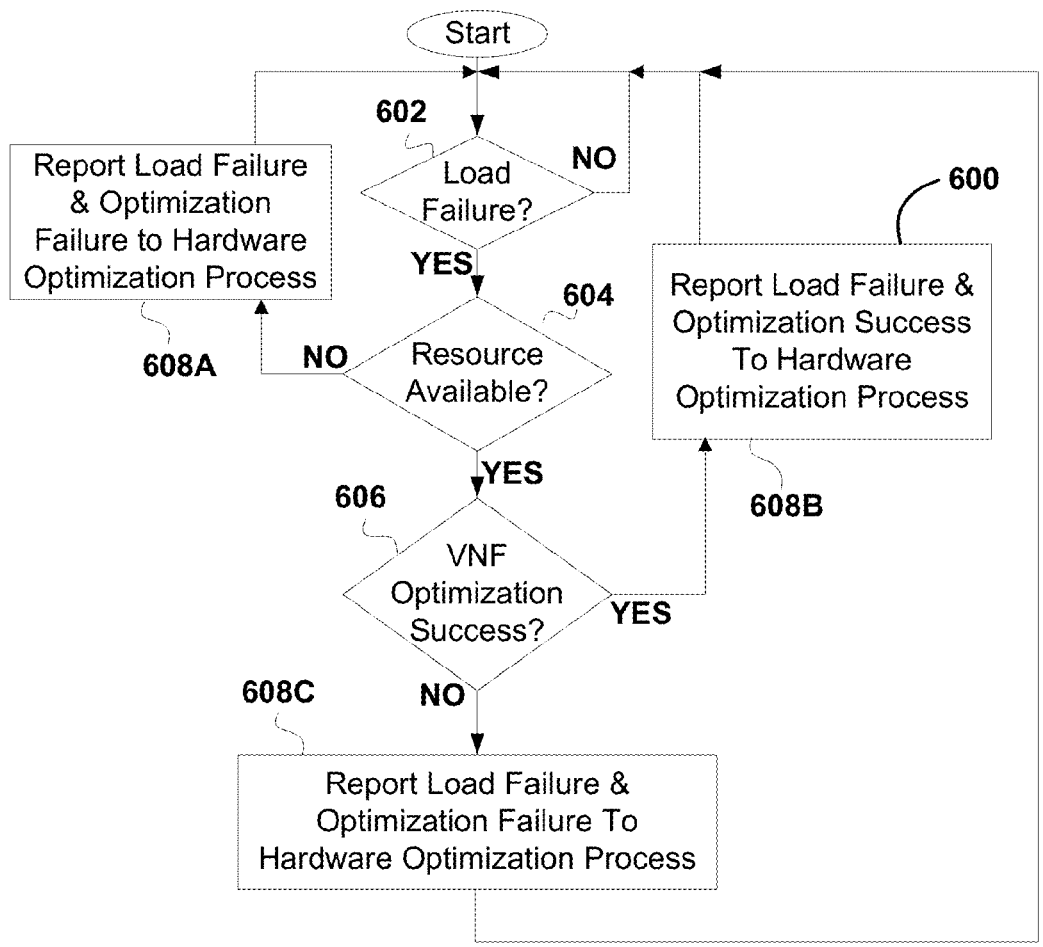
FIG. 6 illustrates a method for hardware optimization in an NFV-based network, in accordance with one embodiment.

FIG. 6 illustrates a method for hardware optimization in an NFV-based network, in accordance with one embodiment. As an option, the method may be viewed in the context of the details of the previous Figures. Of course, however, the method may be viewed in the context of any desired environment. Further, the aforementioned definitions may equally apply to the description below.

FIG. 6 shows one example of how the VNF optimization process may provide data for the hardware optimization process. Of course, the VNF optimization process may provide data for the hardware optimization process based on a variety of scenarios, such as low efficiency deployment, high efficiency deployment, and optimization bottlenecks, etc.

As shown, it is determined whether there is a load failure in the network. See decision 602. For example, a load failure may have occurred (e.g., QoS, QoE, SLA, etc. requirement was not met, etc.), or is anticipated to occur while at least one relevant resource of the network was (or is) still available. For example, there may have been insufficient processing power for a particular VNF while unused processing power is available elsewhere in the network.

Alternatively, the load failure may be a load consolidation failure where, for example, VNFs are migrated out of a resource or a hardware unit to enable shut-down of the resource or a hardware unit. For example, the processing load on a particular hardware unit is low making it candidate for shut-down. There may be enough processing power in in the neighborhood of the hardware unit but not enough in any single hardware unit to enable migrating a particular VNF instance.

Alternatively, the load failure may be a load defragmentation failure where, for example, a defragmentation process fails to provide a sufficient pool. In a state of fragmentation resource availability is spread over many resources and/or hardware units. In other words, many resources and/or hardware units are having small amount of resource availability. Therefore, though the overall network seems to have enough availability, much of it is in quantities too small to be useful. The defragmentation process collects small amounts of resource availability into larger and useful pools in selected hardware units. The defragmentation process includes migrating VNF instances in opposite direction to the availability collection process. The process of pool collection may fail in a manner similar to load optimization, for example, failing to migrate a particular VNF instance.

More information associated with cloud defragmentation may be found in U.S. Provisional Patent Application No. 62/107,943, titled "SYSTEM, METHOD, AND COMPUTER PROGRAM FOR DEFRAGMENTING A NETWORK BASED ON NETWORK FUNCTION VIRTUALIZATION (NFV)", filed Jan. 26, 2015, which is incorporated by reference herein in its entirety.

Accordingly, it is determined whether there are resources available in the network. See decision 604. If no resource of the required type and size is available, the failure is reported to the hardware optimization process. See operation 608A. Further, if a resource is located and assigned to resolve the load failure, it is determined whether the VNF optimization process successfully resolved the load failure. See decision 606.

In this case, the VNF optimization process could have failed to migrate VNFs (and process resource conversion) so as to redistribute the load efficiently. For example, the VNF optimization process may have performed some migration, resource conversion, and load redistribution, but not sufficiently. The process of seeking an optimal deployment may have tried at least one deployment option that failed because it did not meet a particular requirement. For example, this may include an inter-VNF latency limit of a VNF in a VNF chain unrelated to both the source and the failing VNFs.

In this example, the VNF optimization process may report such 'intermediate failures' to the hardware optimization process. See operation 608C. In one embodiment, each such report may include the peak load situation including loads involved and their source VNFs. This may include requirements not met and identification of the failing VNFs, as well as resources that are available but unusable. Further, the reports may include details of the VNF optimization process failure including VNFs (and VNF chains) and their respective requirements and resources which failed the optimization process. In some cases, there may be several VNF optimization process failures (and reports) for each peak load situation.

It is appreciated that the VNF optimization process may also report load failures followed by successful VNF optimization processes, possibly involving successful resource reallocation, resource conversion, VNF migration, and/or load redistribution. See operation 608B. Such success reports are useful to eliminate hardware deployment or redistribution that resolves one problem and creates another.

It is appreciated that steps 602, 604, 606, 608A, 608B and 608C apply to a variety of deployment optimization processes represented here as 'VNF optimization process'. Such deployment optimization processes may include, but are not limited to, VNF deployment optimization module 433 and chain optimization module 434 of FIG. 4, load consolidation processes, fault recovery processes, preventive maintenance processes, processes involving recovery from security breaches, (availability) defragmentation processes, NFV-O deployment recovery processes, etc., as well as other processes planning, operating, or requiring migration of VNF instances which may fail. All such processes may report a relevant failure to the network resource deployment optimization module 413 (represented here as hardware optimization process). More information associated with NFV-O recovery may be found in U.S. patent application Ser. No. 14/572,726.

Figure 7:
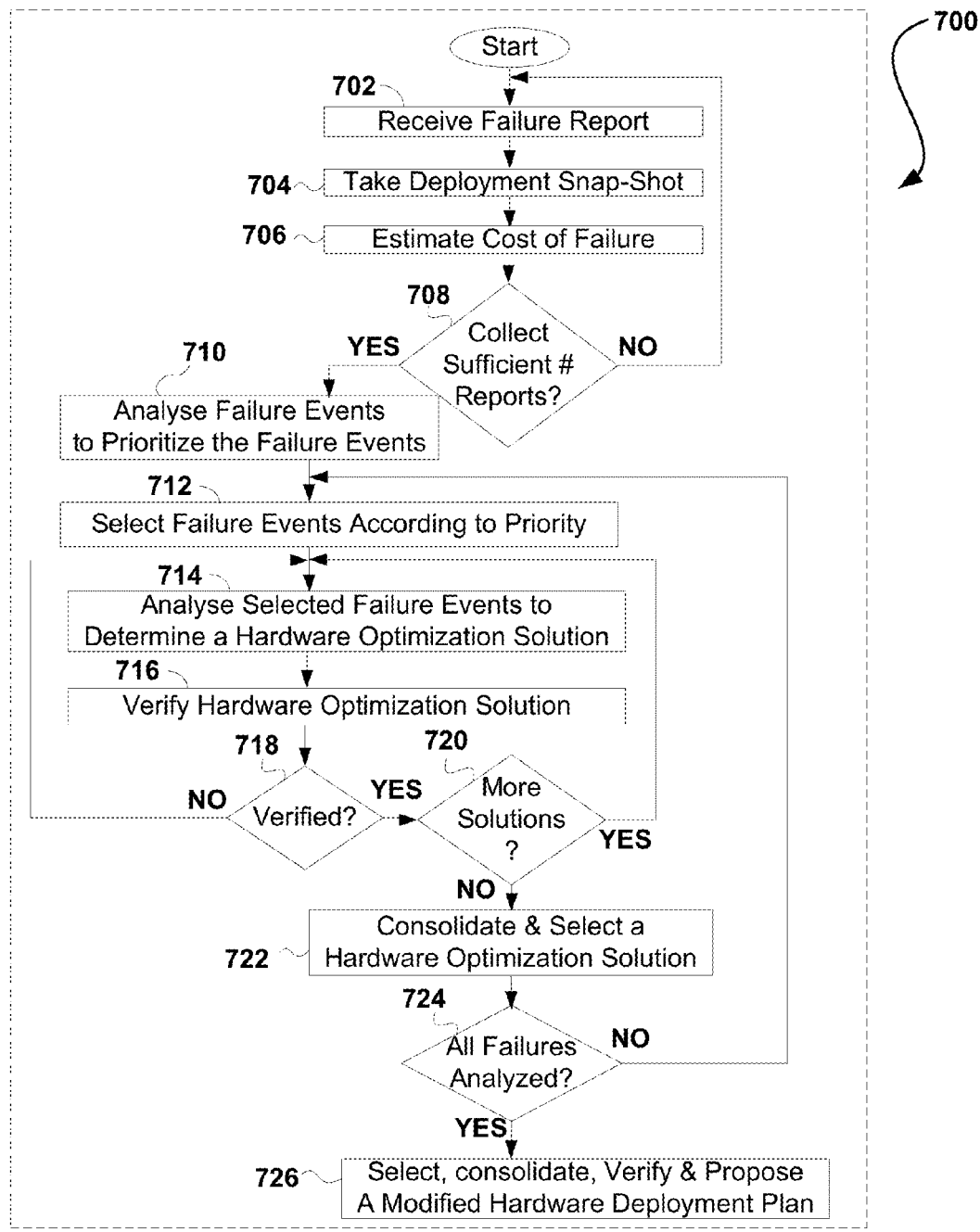
FIG. 7 illustrates a method for hardware optimization in an NFV-based network, in accordance with one embodiment.

FIG. 7 illustrates a method 700 for hardware optimization in an NFV-based network, in accordance with one embodiment. As an option, the method 700 may be viewed in the context of the details of the previous Figures. Of course, however, the method 700 may be viewed in the context of any desired environment. Further, the aforementioned definitions may equally apply to the description below.

FIG. 7 shows one example of a hardware optimization process operating on data provided by VNF optimization process as described above with reference to FIG. 6. Of course, the hardware optimization process may use data provided in a variety of scenarios, such as low efficiency deployment, high efficiency deployment, and optimization bottlenecks, etc.

As shown in FIG. 7, upon receiving a failure report form, for example, a VNF optimization process (see operation 702) as described above, the hardware optimization process may obtain a snap-shot of the current VNF deployment, load requirements and/or distribution, and availability distribution (see operation 704). This snap-shot includes all the data required to simulate the situation in which the reported failure occurred. The hardware optimization process may also record the time or period for which the failure persisted, such as the duration of the relevant load condition (e.g., load peak or load depression). The hardware optimization process may also estimate the cost of the failure (see operation 706). The failure reports and their corresponding snap-shots and cost estimates are then stored in a database as a failure event.

It is noted that the terms failure report and failure event may be used herein to denote a record of a situation involving a load failure, an optimization failure or a similar event associated with any type of lack of resource availability.

Commonly, the failure reports are communicated to a hardware optimization process of the same NFV-O module (e.g., NFV-O leaf component, or VNF-core component) where the failure occurred. However, in some cases, a snap-shot may require a larger view of the respective part of the network involved in the particular failure. In such case the NFV-O module may delegate the failure report to a supervising NFV-O component.

Estimating a cost may be made in various ways. For example, cost estimation may be based on terms of agreements and/or commitments for providing particular services to particular customers, for example, involving SLA, QoS, etc. As another example, cost estimation may be based on lost revenues associated with lack of resource availability for meeting a particular temporal demand. It is appreciated that cost estimations may involve agreements with customers such as consumers, vendors such as vendors of VNFs, content providers and vendors of cloud based services, suppliers such as providers of power and cooling services, etc.

As yet another example, cost estimation may be based on missing an opportunity to save cost of operation by shutting down a hardware unit. Such situation may result, for example, because it has been impossible to migrate one or more VNF instances out of the particular hardware unit. For example, due to lack of resource availability within the network neighborhood of the hardware unit to be shut-down. Such cost estimations may be associated with the length of the period in which the load condition persisted, such as the duration of load peak or load depression. Obviously, cost estimation may be based on any combination of the above described methods.

As still another example, cost estimation may be based on capital and/or operating expenses associated with unused resource availability. Such as a resource, or a part of a resource, that is never used. For example, unused resource availability due to fragmentation, where the resource is too small, or too fragmented, to be used by any VNF instance within range.

When the hardware optimization process determines that a sufficient number of failure events (e.g., load failure reports and/or optimization failure reports with their corresponding snap-shots and cost estimations) are collected (see operation 708) the hardware optimization process may proceed to analyze the reports. The hardware optimization process may then analyze the reports to prioritize the failures (see operation 710).

There may be several ways for the hardware optimization process to determine that the database of failure events is large enough for further processing. A measure or threshold to determine the size of the failure event database may be the number of the reports, the number of resources involved, the number, or the cumulative volume, of the resources of a particular type of resource, the cumulative cost associated with the failure events, etc., and combinations thereof.

There may be several ways for the hardware optimization process to prioritize the failure events. For example, according to their frequency of occurrence, according to their cumulative duration, according to their cost, etc., as well as combinations of the above.

As an example, frequency prioritization may include VNF instances, or VNF chains, or services, that caused, or were involved in, more failure events, resources that cause or were involved in more failure events, and/or resources that were commonly or frequently 'available but unusable'.

As yet another example, prioritizing according to duration may include the total time in which a VNF, VNF chain, service, and/or resource, etc., that caused, or were involved in, failure events.

Similarly, for example, prioritizing according to cost may be based on the total cost associated with a particular load condition causing an optimization failure, or with a VNF, VNF chain, service, and/or resource, etc., that caused, or were involved in, failure events.

Obviously, prioritizing may be based on any combination of the above described methods. Higher priority may be assigned to failure events associated with higher frequency of occurrence, longer cumulative duration, higher cost, etc., as well as combinations thereof.

As a part of this operation the hardware optimization process may also compile a 'load failure map' of the resources, VNF instances, and VNF chains (e.g., services) associated with failure reports. For example, the 'load failure map' may use VNF instances and chains to link between resources thus demonstrating which resources are more frequently, more lengthy, or more costly, involved in load failures associated with various VNF instances and chains. Similarly, the 'load failure map' may use resources to link between VNF instances and chains, thus demonstrating which VNF instances and chains are more frequently, more lengthy, or more costly, involved in load failures associated with various resources.

For example, the hardware optimization process may use the 'load failure map' to assign higher priority to resources and/or VNF instances and chains according to their location in the 'load failure map'. For example, according to their respective 'level of reference'. The 'level of reference' may refer, for example, to the number of links connecting, directly or indirectly, to such resource, VNF instances, or VNF chain. For example, the higher the level of reference, the higher is the priority of the respective resource, VNF instances, or VNF chain.

Hardware optimization process may then select one or more load failures and/or optimization failures (e.g., failure reports, resources associated with failure reports, VNF instances and/or VNF chains associated with failure reports, etc.) according to their respective priority (see operation 712). Hardware optimization process may first select one or more failure reports, resources, VNF instances and/or VNF chains of the highest priority and then progress to lower priorities.

Hardware optimization process may then proceed to operation 714 to analyze the selected load and/or optimization failures to determine one or more hardware optimization solutions.

The hardware optimization process may use any of several methods to determine a possible solution for the particular selection of load failures. In one embodiment, a method to determine a possible solution may include adding hardware/resource within the hardware unit where the load failure and/or optimization failure occurred. In another embodiment, a method to determine a possible solution may include replacing hardware/resource within the hardware unit where the load failure and/or optimization failure occurred.

In yet another embodiment, a method to determine a possible solution may include adding or replacing hardware/resource between such hardware units if transmission or sharing limitation is a cause for the load and/or optimization failure. For example in a load or optimization failure associated with a VNF chain.

In still another embodiment, a method to determine a possible solution may include adding and/or replacing hardware/resource within the nearest hardware unit where the same type of hardware/resource is added and/or replaced by a previously selected solution.

In yet another embodiment, a method to determine a possible solution includes moving hardware/resource towards the edge of the network (closer to the customers). In still another embodiment, a method to determine a possible solution includes moving hardware/resource towards the core of the network to a hardware unit communicatively coupled with as many other hardware units associated with load and/or optimization failures.

If two or more solutions are possible for the particular selection of load failures, the hardware optimization process may select one of the solutions as the best solution. A best solution may be, for example, a solution that solves the highest cost of load failures at the lowest cost of implementation. Some solutions may require adding hardware while other solutions may require rearranging the deployment of existing hardware. Cost of implementation may be measured according to the cumulated cost of additional resources required to implement the solution as well as the cost of installing the resources and/or rearranging the resources. It is appreciated that a solution involving minimal additional hardware may require massive and costly reallocation of other hardware resources.

The hardware optimization process may also run the collected set of load and optimization failures, thus simulating the processes leading to a load peak and/or load depression, and activating the VNF optimization process for each load peak and/or load depression, to verify that the modified hardware deployment indeed improves the situation. See operation 716.

The hardware optimization process may repeat operations 714, and 716 until, for example, at least one valid hardware optimization solution is determined. See operations 718 and 720. The hardware optimization process may then select a best hardware optimization solution from a plurality of hardware optimization solutions determined by operations 714-720. See operation 722.

The hardware optimization process may also try to consolidate solutions obtained for different load failures and optimization failures so as, for example, to reduce the overall cost of implementing the new hardware deployment.

Consolidation may be attempted after all the failure reports were processed, or as a part of operation 722, for all the solutions selected so far.

In one embodiment, the process of consolidation may include consolidating increase of a particular resource in neighboring hardware unit into a hardware unit central to a selected group of added/increased/replaced hardware/resource elements. A hardware unit may be considered central according to its connectivity regarding the added/increased/replaced hardware/resource elements and/or the VNF instances associated with the relevant load failures and optimization failures. Connectivity in this regard may refer to transmission parameters such as bandwidth.

It is appreciated that following a process of consolidation the hardware optimization process may again simulate the processes leading to the load and optimization failure to verify that the consolidated hardware deployment indeed solves all these situations.

When, for example, all failure events are analyzed (see operation 724), the hardware optimization process may then propose one or more modified hardware deployments, see operation 726. It is appreciated that each modified hardware deployment is proposed with its associated estimation of the cost of implementing the new deployment (e.g., CAPEX) and its associated estimation of the cost saved (e.g., OPEX). It is appreciated that implementing a new hardware deployment should preserve service continuity, should not interrupt ongoing services, and should not adversely affect the performance of the network.

As shown in FIG. 7, operation 726 may include selecting one or more of the hardware optimization solutions determined in operations 710-724, consolidating two or more of the hardware optimization solutions determined in operations 710-724, and verifying that the selected and/or consolidated hardware optimization solutions properly resolve the reported failure event. Operation 726 may also include calculating the cost of implementing each of the hardware optimization solutions and calculating the cost saved by each of the hardware optimization solutions.

It is appreciated that the hardware optimization process described above may refer to a process executed by a deployment optimization module of a particular NFV-O module. For example, a leaf NFV-O module. The results of the hardware optimization process as provided in operation 726 may then be forwarded to a supervising core component. The supervising core component may then try to further optimize the proposed (modified) hardware deployment plan, for example by consolidating hardware deployment plan of two or more subordinate NFV-O modules.

Figure 8:
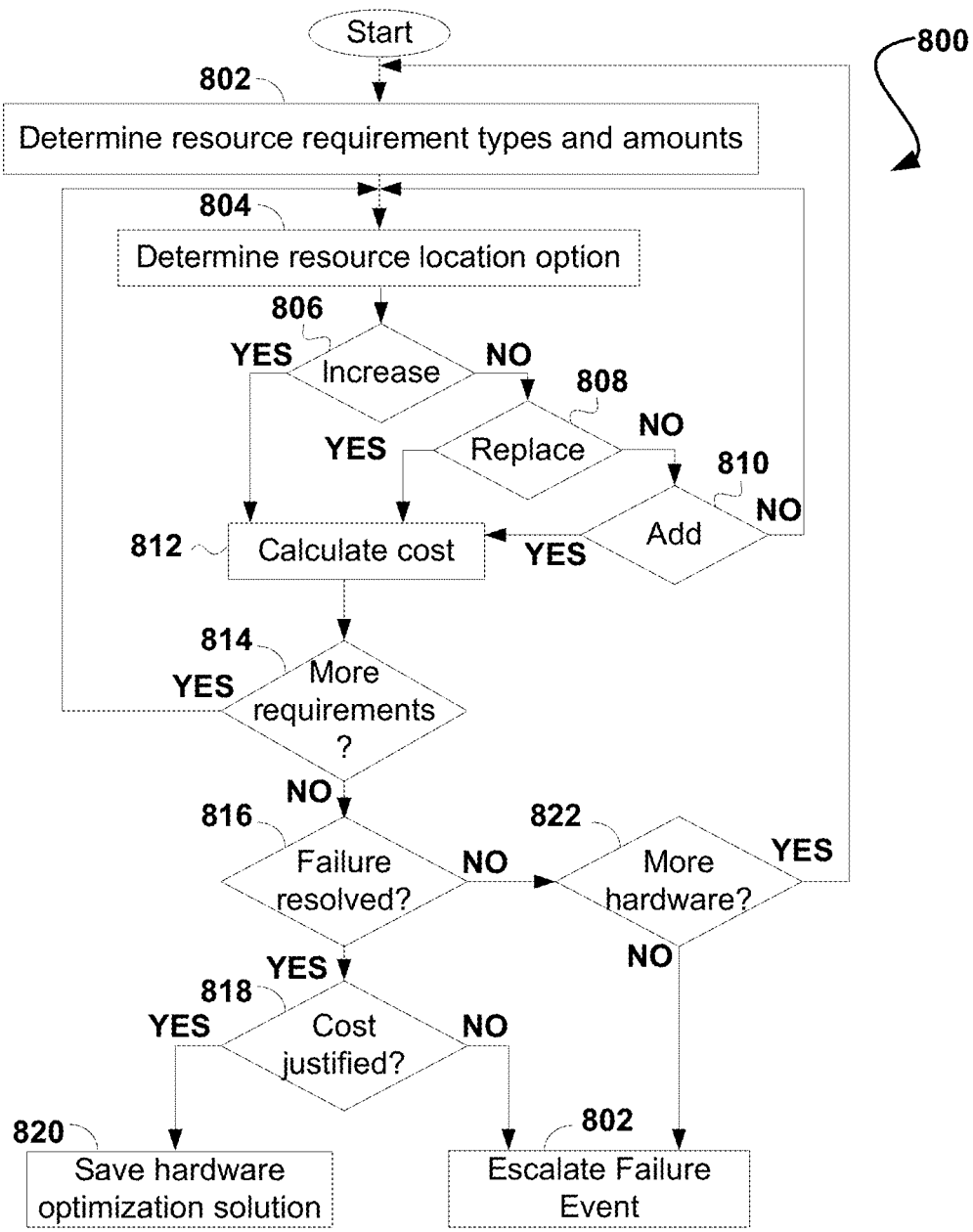
FIG. 8 illustrates a simplified flow chart of one embodiment of a deployment solution process.

FIG. 8 illustrates a simplified flow chart 800 of one embodiment of a deployment solution process. This embodiment of deployment solution process may analyze a selected load and/or optimization failures to determine one or more hardware optimization solutions as shown and described by operation 714 of FIG. 7.

The deployment solution process may therefore be a part of the hardware optimization process as described above. As an option, the flow chart 800 may be viewed in the context of the details of the previous Figures. Of course, however, the flow chart 800 may be viewed in the context of any desired environment. Further, the aforementioned definitions may equally apply to the description below. It is appreciated that the goal of the deployment solution process is to prepare a hardware optimization solution for a particular failure event, or a group of failure events.

As shown in FIG. 8, the deployment solution process 800 may start with operation 802 to determine the requirement associated with a selected one or more load failure or optimization failure reports. Such requirement may be a demand for one or more types of resources such as processing power, memory, storage, transmission requirement, energy, cooling, etc.

The deployment solution process 800 may then proceed to operation 804 to determine an optional location for at least one resource to provide for at least one of the requirement determined in operation 802. The deployment solution process 800 may then determine if the required resource may be increased (see decision 806), replaced (see decision 808), or added (see decision 810) in this location.

A possible solution for insufficient availability of a particular resource type in a particular location is to add a device of such resource type in that location (decision 810). Another possible solution, which may be advantageous, is to replace an existing device with a larger device (or a faster device, etc.), see decision 808. Yet another possible solution, which may be most advantageous, is to increase the size (or speed) of a device that is already proposed for installation in that location (see decision 806). In such case a device of the required resource type is already planned or proposed for this location to solve another (e.g., previously processed) failure event and it may therefore be least expensive to increase the size (or speed, bandwidth, etc.) of that device rather than replacing another device or adding a device.

The deployment solution process 800 may then proceed to operation 812 to calculate the cost of implementing the proposed solution. Operations (and decisions) 804 to 812 may be repeated until all the requirements associated with the particular failure event are resolved (decisions 814 and 816).

The deployment solution process 800 may then proceed to operation 818 to determine if the solution is justified, for example, by comparing the cost saved by the solution with the cost of implementing the solution. If the solution is justified the deployment solution process 800 may save the particular hardware optimization solution for further processing, see operation 820.

If the solution is not justified (decision 818), or if the failure event is not resolved, the deployment solution process 800 may delegate, or escalate, the failure event. The deployment solution process 800 may fail to resolve a failure event, for example, for lack of optional locations or hardware units (see decision 822). Such lack of options may be determined, for example, within an appropriate range of the failure location, within the territory of the particular NFV-O processing the present deployment solution process 800, etc. The present deployment solution process 800, or the NFV-O processing the present deployment solution process 800, may then delegate, or escalate, the failure event to its supervising NFV-O core module.

It is appreciated that a failure event that is not solved within a particular NFV-O module can be delegated or escalated in the NFV-O hierarchy until it is resolved, or up to the root NFV-O module, where, if it is not resolved, may be reported to an external system such as a business support system (BSS) that has ordered that service or VNF involved.

Figure 9:
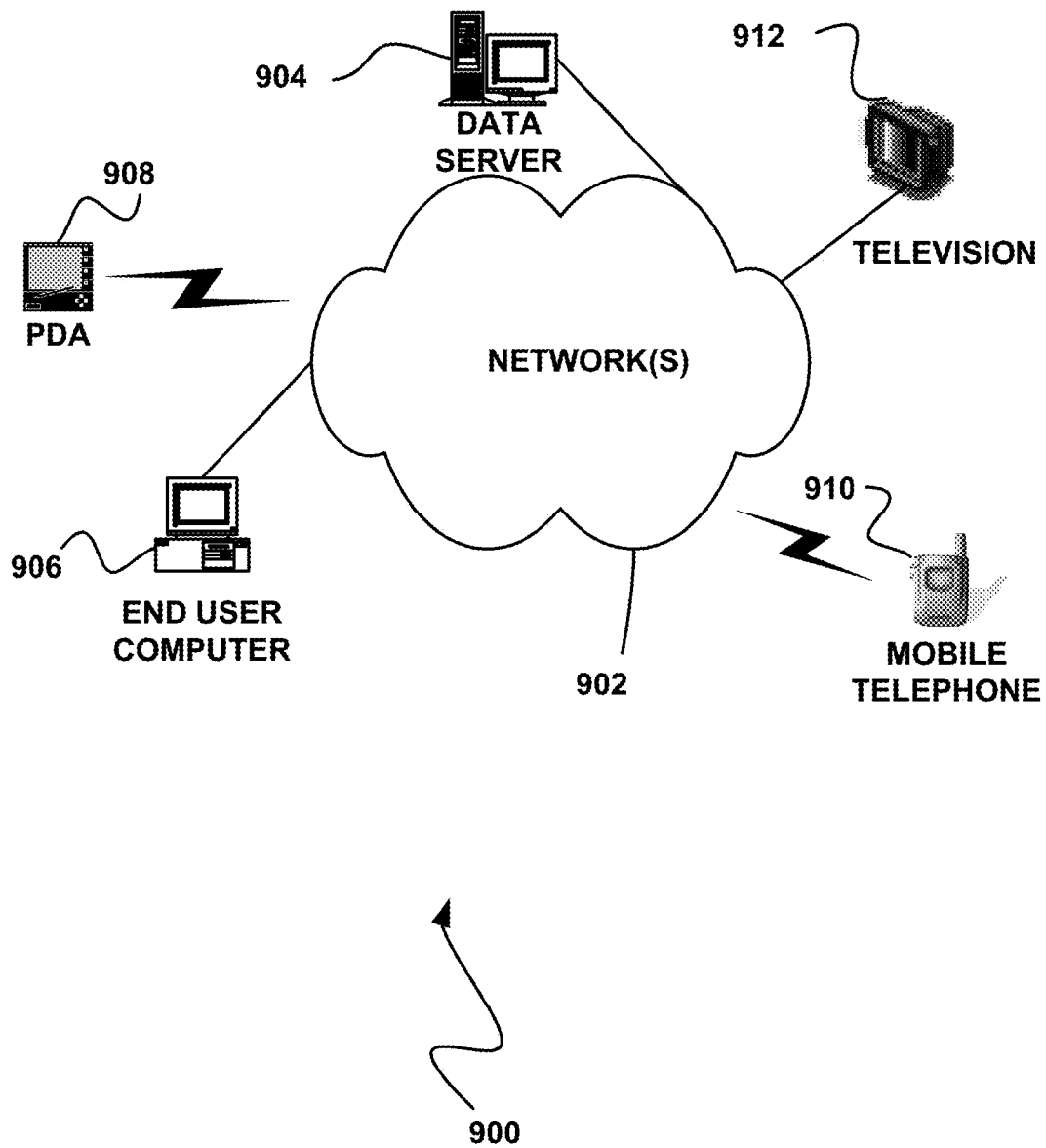
FIG. 9 illustrates a network architecture, in accordance with one possible embodiment.

FIG. 9 illustrates a network architecture 900, in accordance with one possible embodiment. As shown, at least one network 902 is provided. In the context of the present network architecture 900, the network 902 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 902 may be provided.

Coupled to the network 902 is a plurality of devices. For example, a server computer 904 and an end user computer 906 may be coupled to the network 902 for communication purposes. Such end user computer 906 may include a desktop computer, lap-top computer, and/or any other type of logic. Still yet, various other devices may be coupled to the network 902 including a personal digital assistant (PDA) device 908, a mobile phone device 910, a television 912, etc.

Figure 10:
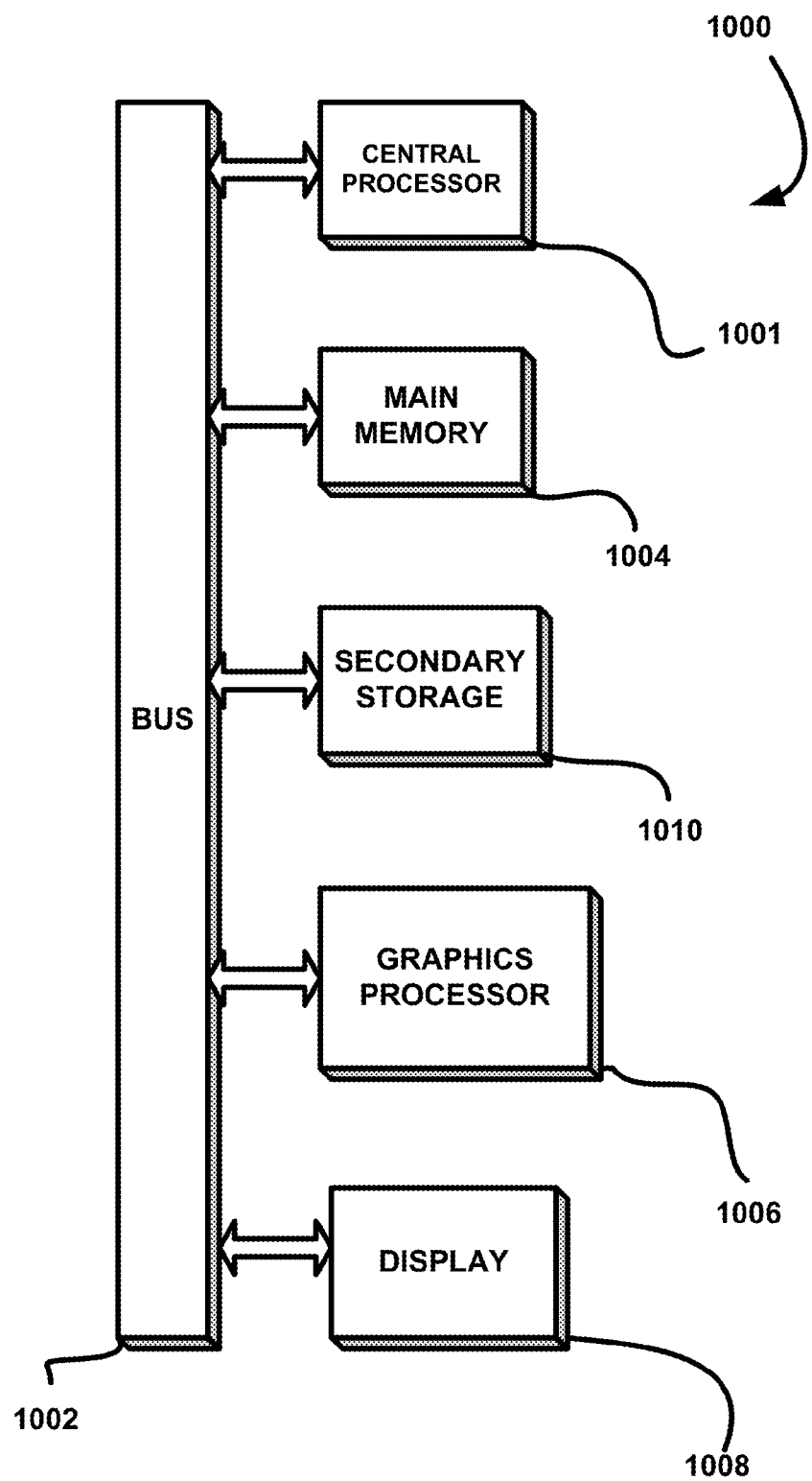
FIG. 10 illustrates an exemplary system, in accordance with one embodiment.

FIG. 10 illustrates an exemplary system 1000, in accordance with one embodiment. As an option, the system 1000 may be implemented in the context of any of the devices of the network architecture 900 of FIG. 9. Of course, the system 1000 may be implemented in any desired environment.

As shown, a system 1000 is provided including at least one central processor 1001 which is connected to a communication bus 1002. The system 1000 also includes main memory 1004 [e.g., random access memory (RAM), etc.]. The system 1000 also includes a graphics processor 1006 and a display 1008.

The system 1000 may also include a secondary storage 1010. The secondary storage 1010 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1004, the secondary storage 1010, and/or any other memory, for that matter. Such computer programs, when executed, enable the system 1000 to perform various functions (as set forth above, for example). Memory 1004, storage 1010 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
migrating, as part of a Virtual Network Function (VNF) optimization process within a Network Function Virtualization based (NFV-based) communication network, a VNF instance of a VNF between processing units in the NFV-based communication network, according to a change of load;
after migrating the VNF instance, determining that a predefined resource requirement associated with the VNF instance is not met as a result of the migration;
generating a failure report indicating that the predefined resource requirement associated with the VNF instance is not met;
based on the failure report, performing a hardware optimization process within the NFV-based communication network to meet the predefined resource requirement associated with the VNF instance.

2. A computer program product embodied on a non-transitory computer readable medium, comprising:
computer code for migrating, as part of a Virtual Network Function (VNF) optimization process within a Network Function Virtualization based (NFV-based) communication network, a VNF instance of a VNF between processing units in the NFV-based communication network, according to a change of load;
computer code for, after migrating the VNF instance, determining that a predefined resource requirement associated with the VNF instance is not met as a result of the migration;
computer code for generating a failure report indicating that the predefined resource requirement associated with the VNF instance is not met;
computer code for, based on the failure report, performing a hardware optimization process within the NFV-based communication network to meet the predefined resource requirement associated with the VNF instance.

3. A system comprising:
a memory system; and
one or more processing cores coupled to the memory system and that are each configured to:
migrate, as part of a Virtual Network Function (VNF) optimization process within a Network Function Virtualization based (NFV-based) communication network, a VNF instance of a VNF between processing units in the NFV-based communication network, according to a change of load;
after migrating the VNF instance, determine that a predefined resource requirement associated with the VNF instance is not met as a result of the migration;
generate a failure report indicating that the predefined resource requirement associated with the VNF instance is not met;
based on the failure report, perform a hardware optimization process within the NFV-based communication network to meet the predefined resource requirement associated with the VNF instance.

4. The method of claim 1, wherein the hardware optimization process determines a modified hardware deployment and verifies that the modified hardware deployment, once instantiated, meets the predefined resource requirement associated with the VNF instance.

5. The method of claim 1, wherein the VNF instance is included in a chain of interconnected VNF instances that are executed to provide a communication network service.

6. The method of claim 5, wherein the VNF instance is migrated for optimizing deployment of the chain of the interconnected VNF instances.

7. The method of claim 5, wherein the predefined resource requirement is specific to the chain of the interconnected VNF instances.

8. The method of claim 7, wherein the predefined resource requirement requires the VNF instance reside on a same computing device as another one of the VNF instances in the chain.

9. The method of claim 1, wherein the predefined resource requirement includes a requirement of at least one of: processing power, cache memory capacity, regular memory capacity, non-volatile memory capacity, storage capacity, and cooling.

10. The method of claim 1, wherein the predefined resource requirement relates to a quality of service (QoS) and includes at least one of: maximum latency or delay, average latency and maximum variance, and maximum allowed packet loss.

11. The method of claim 1, wherein the predefined resource requirement is specific to the VNF instance.

12. The method of claim 1, wherein the VNF optimization process refers to software and operational aspects of the NFV-based network, and wherein the hardware optimization process refers to networking and processing aspects of the NFV-based network.

13. The method of claim 12, wherein the VNF optimization process is performed for at least one of: VNF chain optimization, preventive maintenance, fault recovery, security management, defragmentation processes, and load consolidation.

14. The method of claim 1, wherein upon receiving the failure report, the hardware optimization process obtains a snap-shot of a current VNF deployment, load requirements and distribution.

15. The method of claim 1, wherein the failure report is collected with other failure reports generated when other predefined resource requirements associated with other VNF instances are not met, and a threshold is determined to be met by the collected failure reports, the hardware optimization process performs further processing to meet each of the predefined resource requirements associated with each of the VNF instances.

16. The method of claim 15, wherein the hardware optimization process determines a separate solution for each of the predefined resource requirements associated with each of the VNF instances, and wherein the hardware optimization process performs consolidation of the solutions, wherein the consolidation identifies a single solution that meets two or more of the predefined resource requirements associated with two or more of the VNF instances.

* * * * *